United States Patent [19]
Mebane

[11] Patent Number: 5,930,478
[45] Date of Patent: Jul. 27, 1999

[54] SYSTEM FOR STARTING TRANSMISSION ASSUMING ONE FILE FORMAT, AUTOMATICALLY DETECTING WHETHER PROPER FORMAT USED, AND ABORTING AND RESTARTING TRANSMISSION IF ORIGINAL FORMAT INCORRECT

[75] Inventor: Cummins Aiken Mebane, Cary, N.C.

[73] Assignee: International Business Machines Corporation, Armonk, N.Y.

[21] Appl. No.: 08/674,478

[22] Filed: Jul. 2, 1996

[51] Int. Cl.⁶ .............................. G06F 13/14; H04L 12/00
[52] U.S. Cl. ................... 395/200.68; 395/200.53; 395/500; 395/872
[58] Field of Search .............................. 395/500, 200.68, 395/616, 621, 200.53, 872, 187.01

[56] References Cited

U.S. PATENT DOCUMENTS

| | | | |
|---|---|---|---|
| 5,077,732 | 12/1991 | Fischer et al. ............................ | 370/85.4 |
| 5,218,458 | 6/1993 | Kochis et al. ............................ | 358/448 |
| 5,426,645 | 6/1995 | Haskin .................................... | 370/118 |
| 5,499,374 | 3/1996 | Di Giulio et al. ....................... | 395/728 |
| 5,548,702 | 8/1996 | Li et al. .................................. | 395/155 |
| 5,548,727 | 8/1996 | Meehan .............................. | 395/200.13 |
| 5,559,933 | 9/1996 | Boswell .................................. | 395/114 |
| 5,706,457 | 1/1998 | Dwyer et al. ........................... | 395/349 |

*Primary Examiner*—Thomas C. Lee
*Assistant Examiner*—Rehana Perveen
*Attorney, Agent, or Firm*—Jeanine S. Ray-Yarletts

[57] ABSTRACT

A telecommunications method and system for providing transfer of information over the Internet using the TCP/IP FTP (File Transfer Program) protocol wherein the user is not required to know the format of the contents of the file to be transferred. The invention processes the contents of the file being transferred and will re-initiate the transfer in the appropriate mode if it is determined that the file being transferred is not in a binary format.

7 Claims, 7 Drawing Sheets

SYSTEM FOR STARTING TRANSMISSION ASSUMING ONE FILE FORMAT, AUTOMATICALLY DETECTING WHETHER PROPER FORMAT USED, AND ABORTING AND RESTARTING TRANSMISSION IF ORIGINAL FORMAT INCORRECT

FIELD OF THE INVENTION

The present invention relates to file transfer on the Internet. More particularly, it relates to automatic detection of the contents of a file thereby allowing the use of the FTP protocol for transferring the files without manual intervention by the user and without the user understanding the contents of the file.

BACKGROUND OF THE INVENTION

The Internet is quickly becoming the most prevalent method of telecommunications in the world. In the last quarter of 1995, it is estimated that over 20 million users accessed the Internet although few people understand what the Internet is. The Internet is a name given to the massive connection of different TCP/IP networks. These networks contain host computers, workstations, and mini-computers and are connected by routers, telephone lines, coax cables and many other pieces of equipment. The Internet consists of a three level hierarchy which allows the computers or workstations to connect. The hierarchy consists of backbone networks such as ARPAnet, NSFNet and MILNET, mid-level networks such as company networks and stub networks providing a lower level of granularity and addressability to the mid-level networks.

With the increase in the popularity of the Internet also comes a decrease in the programming expertise of the average user of the Internet. It used to be that the Internet was primarily used by university scholars who had expertise in the area of computer programming or members of the military with special training. As the network communications age continues to evolve, a significant number of network providers have started providing access to the internet for the average user. For a monthly fee, and sometimes a per minute access rate, you can gain access to the Internet through America On-Line, Prodigy, CompuServe or many others. This has allowed virtually every home that has a telephone and a computer access to the Internet. Children are using the Internet to access on-line encyclopedias for school research, parents are using the Internet to make airline reservations, order merchandise, get up-to-date news and monitor the stock market. This change in the average user has uncovered a need to provide an intelligent interface which will allow users to transfer files. The interface must not require any information from the user concerning the contents or origin of the file to be transferred. It should be a 'point-and-click' interface that will reliably transfer any file from wherever it is located to the user's local machine.

The base protocol used to build the Internet is TCP/IP (Transmission Control Protocol/Internet Protocol). File transfer is traditionally done using FTP (File Transfer Protocol) which is defined in the Request For Comment document RFC 959 of the IETF ("Internet Engineering Task Force"). This protocol describes both the client and the server architecture which allows file transfer between two computers.

While there are several data formats defined by FTP, two are commonly used to transfer almost all data. The binary format defines data that is to be transferred exactly as it appears on the sending computer without any alteration. The ASCII format is used to transfer data that is typically known as a 'text file' and contains data in a human readable form. Throughout the present invention, references to ASCII or EBCDIC depict data that is in a human readable TEXT format. Failure to transfer the data using the correct format will render the data useless to the receiver of the data. The format is indicated by sending a command to the FTP server prior to the initialization of data transfer.

There is no support in the FTP protocol, nor is there a standard naming convention, that may be used to determine the correct data format of a file being transferred by FTP. The burden of this determination falls on the user of a computer program that uses the FTP protocol. This can be extremely difficult, especially for novice users who don't understand the differences between the file modes and how the data is actually stored. Some GUI (Graphical User Interface) clients attempt to maintain a mapping of the mode based on the file extension, but this is unreliable and requires that the user know enough to use the proper file extensions. An assumption which may be unreasonable where novice users are concerned.

Additional problems arise with this technique in that some files have no extensions, there is no concrete standard convention for extensions, the user is responsible for adding and deleting items from the list for the identified file extensions, and the method only works if all of the rules are followed.

SUMMARY OF THE INVENTION

The present invention solves the problem of determining the appropriate mode to use while transferring files using FTP. It provides an automated method of detecting the type of file while allowing for a retransmission if it is determined that the original attempt at transmission was performed in the wrong mode. It includes a telecommunications method and system for transferring files between a source computer and a target computer using the Internet, TCP/IP and the FTP protocols, comprising the steps of: setting an FTP transfer mode to binary; reading a buffer from the source computer; writing the buffer to the target computer; scanning the buffer to determine whether it contains any non-ASCII characters; if no non-ASCII characters are found, issuing an FTP abort transfer, setting the FTP transfer mode to ASCII; and transferring until the complete file is delivered by reading a buffer from the source computer and writing the buffer to the target computer.

DESCRIPTION OF THE PREFERRED EMBODIMENT

The preferred embodiment of the present invention has been implemented into a function called Automode. Automode uses an entirely different approach to determining the proper mode for file transmission. Rather than asking the user or interrogating the file extensions, Automode interrogates the data contained within the file itself. Utilizing the design flexibilities available for the lower level FTP API class, once Automode has begun the transfer, it is able to stop, change the mode, and restart the transfer using the appropriate mode if it is determined that the inappropriate mode was initially chosen. This is all done transparently to the user.

A significant additional advantage of Automode's ability to detect file types is that a group of files which are not necessarily the same type can be sent successfully using a single drag and drop command. Prior to the present invention, a user desiring to transmit a group of files using a single FTP command was required to ensure that all of the files being sent were of the same type. If the user wanted to transmit both ASCII and binary files, he was required to split the files into two groups and send the binary files using one command, then send the text files using a separate command. This was required because the FTP clients will transfer a group of files, but will only transfer them in the "current" mode. Clients without the current invention implemented have no means of changing the current mode during transmission.

Figure 1:
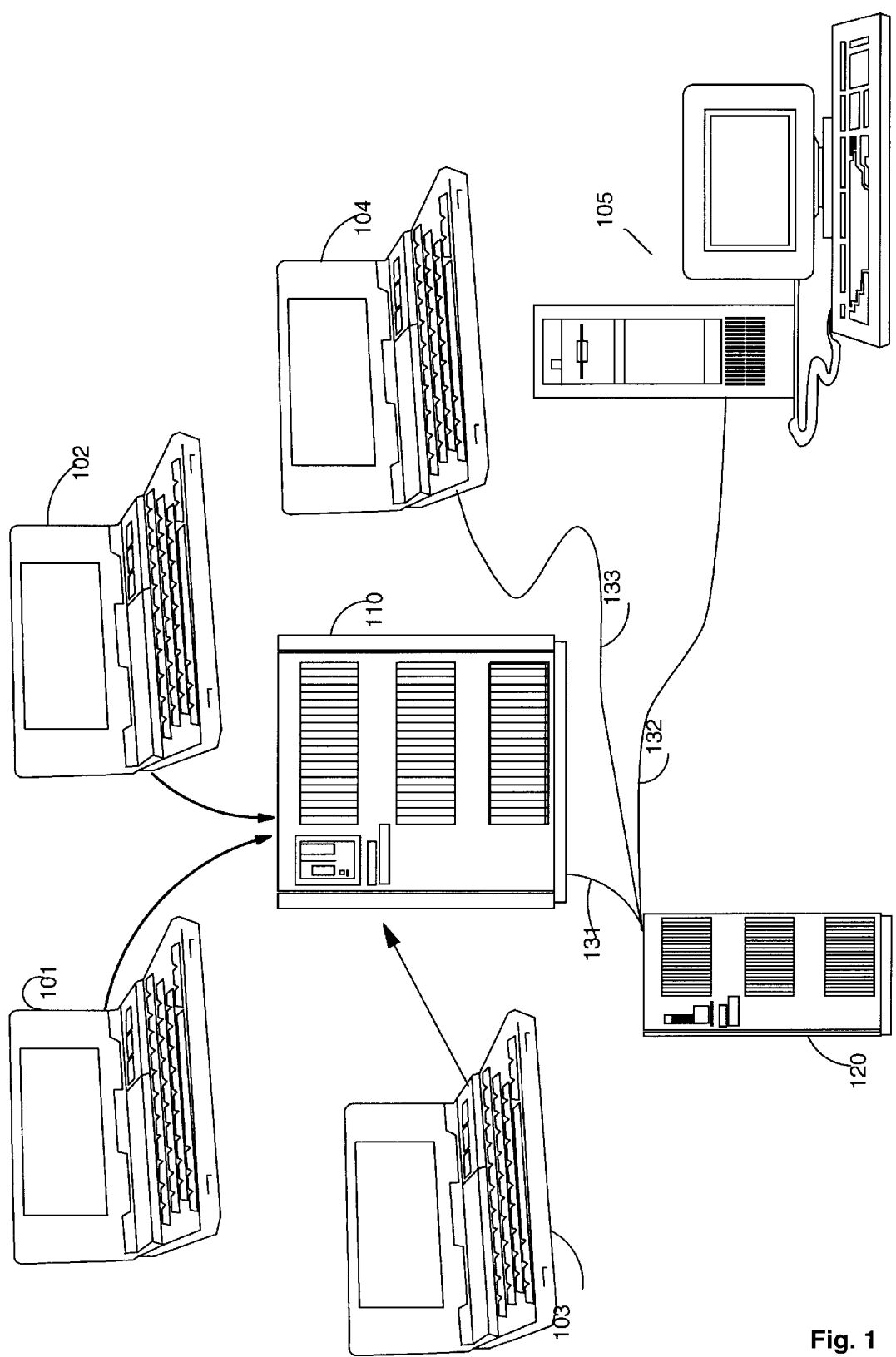
FIG. 1 is an example of a simplified subset of the Internet network.

A miniaturized version of a sample subset of the Internet is demonstrated in FIG. 1. It contains multiple end users (101–105) connected to one another. The Internet, in reality consists of millions of computers connected together, but this picture is just being used for example purposes. The computers labeled 101, 102 and 103 are connected, either directly by cable or through a switched line, to a host computer 110. The host computer 110, in this case, provides the connection to the public switched network through which the computers (101–103) can access the Internet. The host computer 110 accesses a phone line 131, which is attached to a private branch exchange (PBX) 120, which provides the linkage for other computers (104–105) to access the host and its connected computers (101–103).

As is shown in FIG. 1, there is no need to utilize a host computer to access the Internet, a user with a PS/2 105 or a notebook computer 104 can access the phone lines (133, 132) directly using a modem and gain access to the Internet. As mentioned before, this is an extremely simplistic view of the Internet. In reality, service providers such as Prodigy or CompuServe allow the users to dial into their computers which, in turn provide access to the Internet. In addition, large companies or government organizations will provide their own access to the Internet.

Figure 2A:
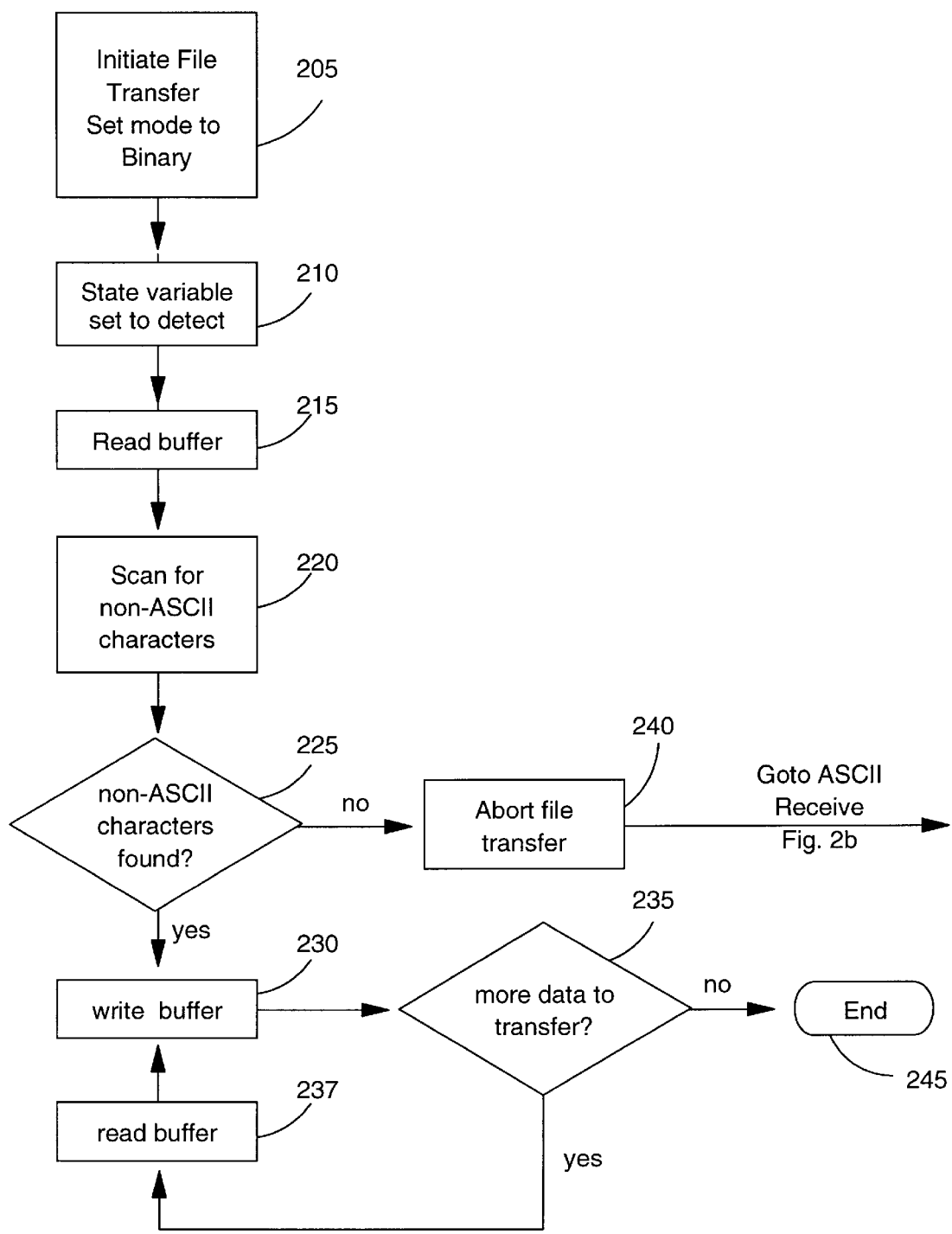
FIGS. 2a–2b depict the logical flow of the present invention.
Figure 2B:
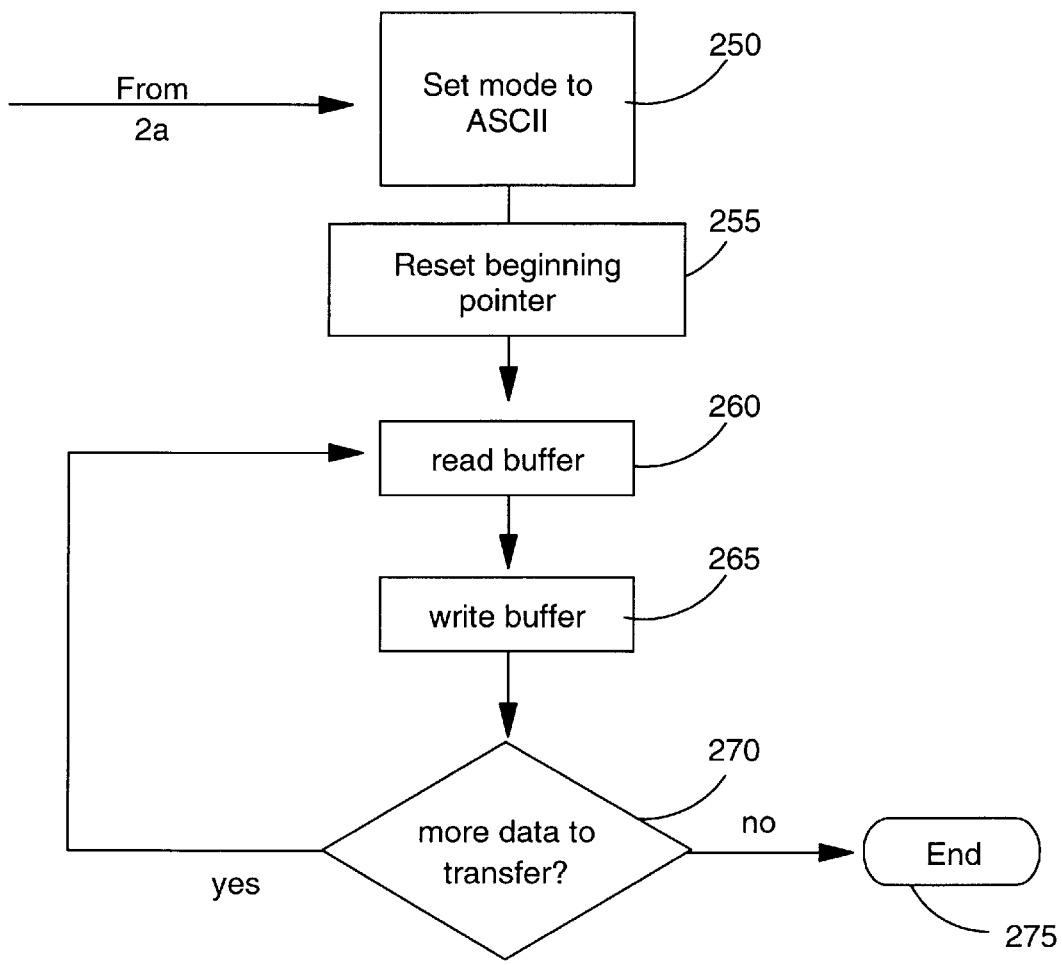

FIG. 2 shows a flow chart of the preferred embodiment of the present invention. To enter into the AutoMode logic, the user first initiates a file transfer. This means that the user does something to indicate that they desire to have a file delivered to their personal storage or that they desire to send a file to someone else. In the preferred embodiment, this is implemented as a drag and drop method as shown in FIG. 4.

Figure 4:
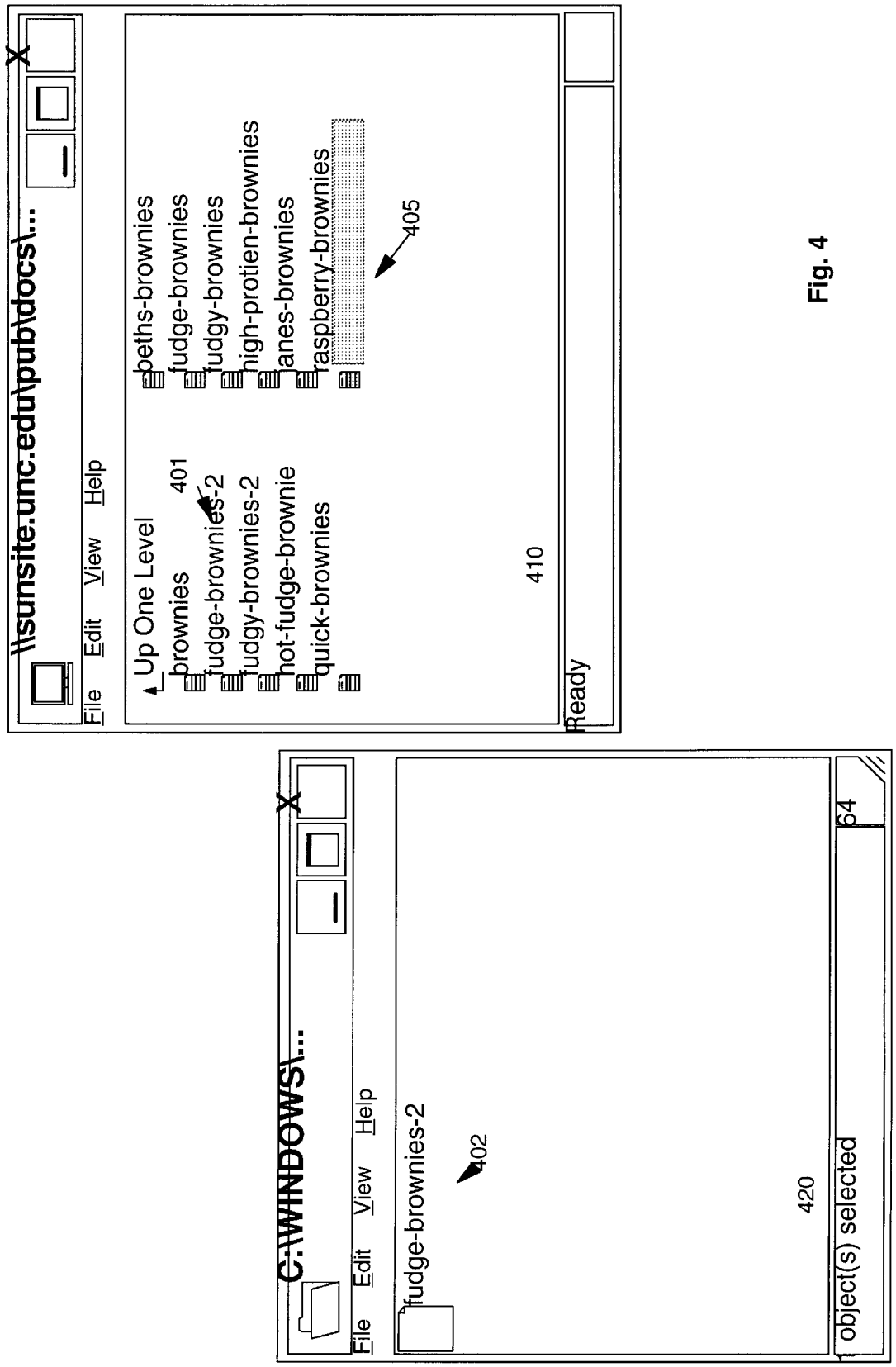
FIG. 4 shows the user interface of the preferred embodiment.

As is shown in FIG. 4, the user uses a pointing device (usually a mouse, although this is not a limitation of the present invention) to move the pointer to the appropriate file. The user then indicates the file transfer by dragging the file name 405 from the source window 410 and dropping it in the window representing the target location 420. The selection of the file is indicated in this particular embodiment by the file name being highlighted. In FIG. 4, the file 'fudge-brownies-2' 401 was transferred 402 from the window representing the server 410 to the user's local machine represented by window 420. The user has then selected and highlighted 'raspberry-brownies' 405 in preparation for transfer.

Returning to FIG. 2, the file transfer is initiated with the file mode being set to Binary 205, then a state variable is set to detect 210. This indicates that the logic traversed by the application should include verifying the contents of the buffer being sent or received. A buffer is then read 215 from either the target machine to transfer to the user's personal storage or from the user's personal storage to transfer to the target FTP Server. The AutoMode application scans the buffer for any non-ASCII characters 220, a test is then made to determine whether any non-ASCII characters were found 225. If non-ASCII characters were found, the buffer is written to the destination location 230 and a test is made to determine whether there is more data left to be transferred 235. If there is more data available for transfer, the application then reads the next buffer 237, then control returns to 230 to write the buffer. If there was no more data available to transfer, this means that the transfer has completed successfully, therefore the application terminates 245.

If, when the test is made for non-ASCII characters 225, it was determined that there were no non-ASCII characters in the buffer, this means that the file was an ASCII file and should have been transferred as an ASCII file. The original file transfer is aborted 240 using standard FTP protocol (FTP ABOR). The mode is set then to ASCII 250 using the FTP protocol TYPE A command. The pointer to the file to be transferred is reset to the beginning of the file 255. The transfer is then restarted by reading a buffer 260 with the mode being ASCII. The buffer is then written to the target location as an ASCII file 265. A test is made to determine whether there is more data available to transfer 270. If there is, the AutoMode application returns to read another buffer 260. This continues until there is no more data available to transfer from the source to the target location. When there is no longer any data available, the application terminates 275.

Since the standard transmit buffer for FTP is a 4K buffer, in general use, if a file is a binary file, it will have a non-ASCII character (often a screen formatting character) within the first 4K bytes of the file. Therefore, in application, this method has proven to be extremely accurate. An extension to this method has been implemented to also recognize EBCDIC TEXT files as opposed to ASCII text files as is shown in FIG. 3.

The TEXT mode for the file transfer is determined based on the TEXT mode of the sending device. While the transfer itself is conducted in the same manner whether the host in an ASCII host or an EBCDIC host, the characters that are valid TEXT characters vary. Therefore, it is helpful to know what the TEXT type of the source host is. In order to determine whether the TEXT mode for the sending device is ASCII or EBCDIC, the Automode application must know the operating system of the sending machine. For instance, if the sending machine is running the IBM VM or IBM MVS operating systems, then any text files that they send will be EBCDIC. If the sending operating system is OS/2 or Microsoft Windows, then any text files that are sent will be ASCII "(OS/2 is a registered trademark of the International Business Machines Corporation ("IBM"). Microsoft and Windows are registered trademarks of Microsoft Corporation.)" The operating system is irrelevant for transmission of binary files since they are sent without alteration.

Figure 3A:
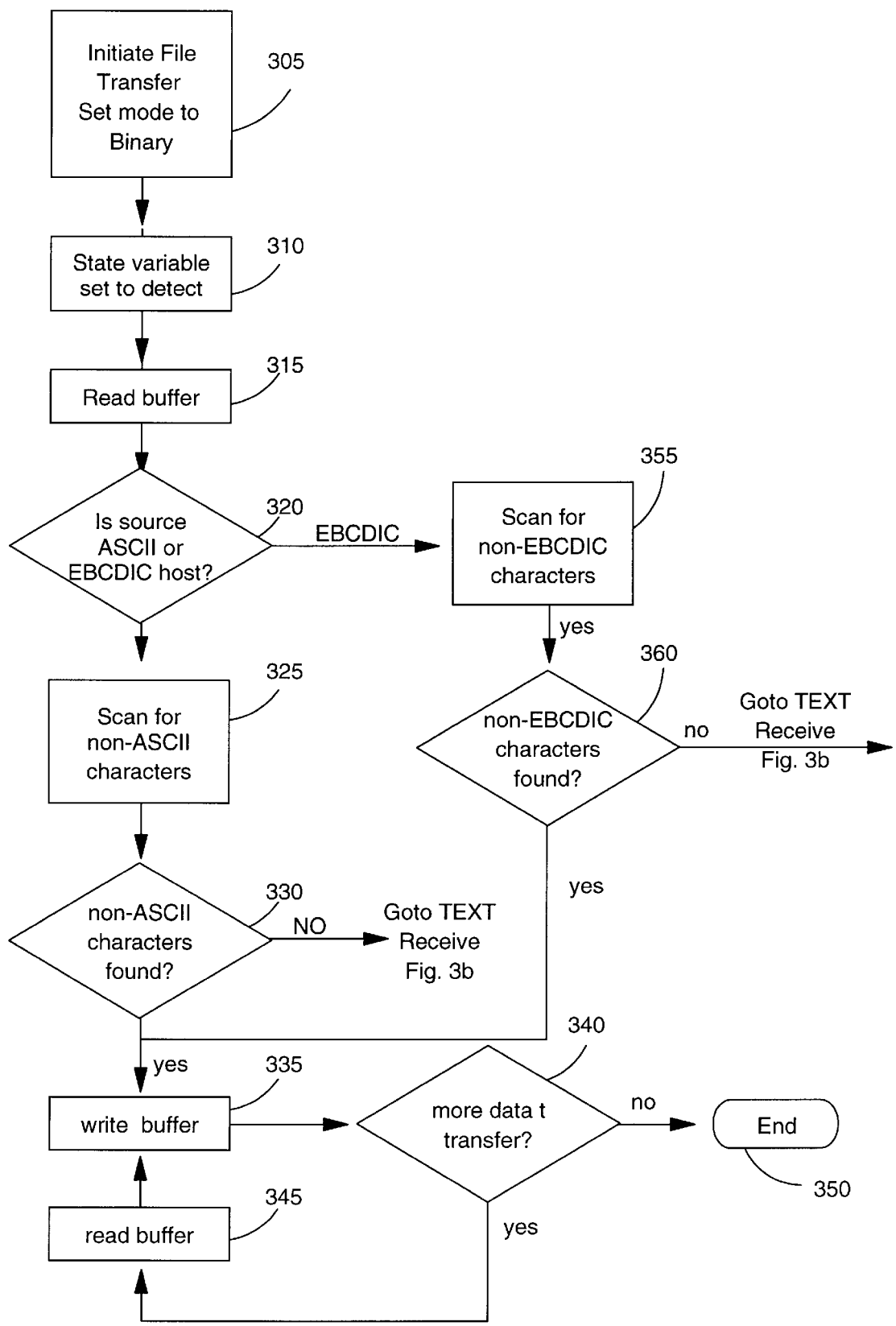
FIGS. 3a–3b are an enhancement including EBCDIC detection.
Figure 3B:
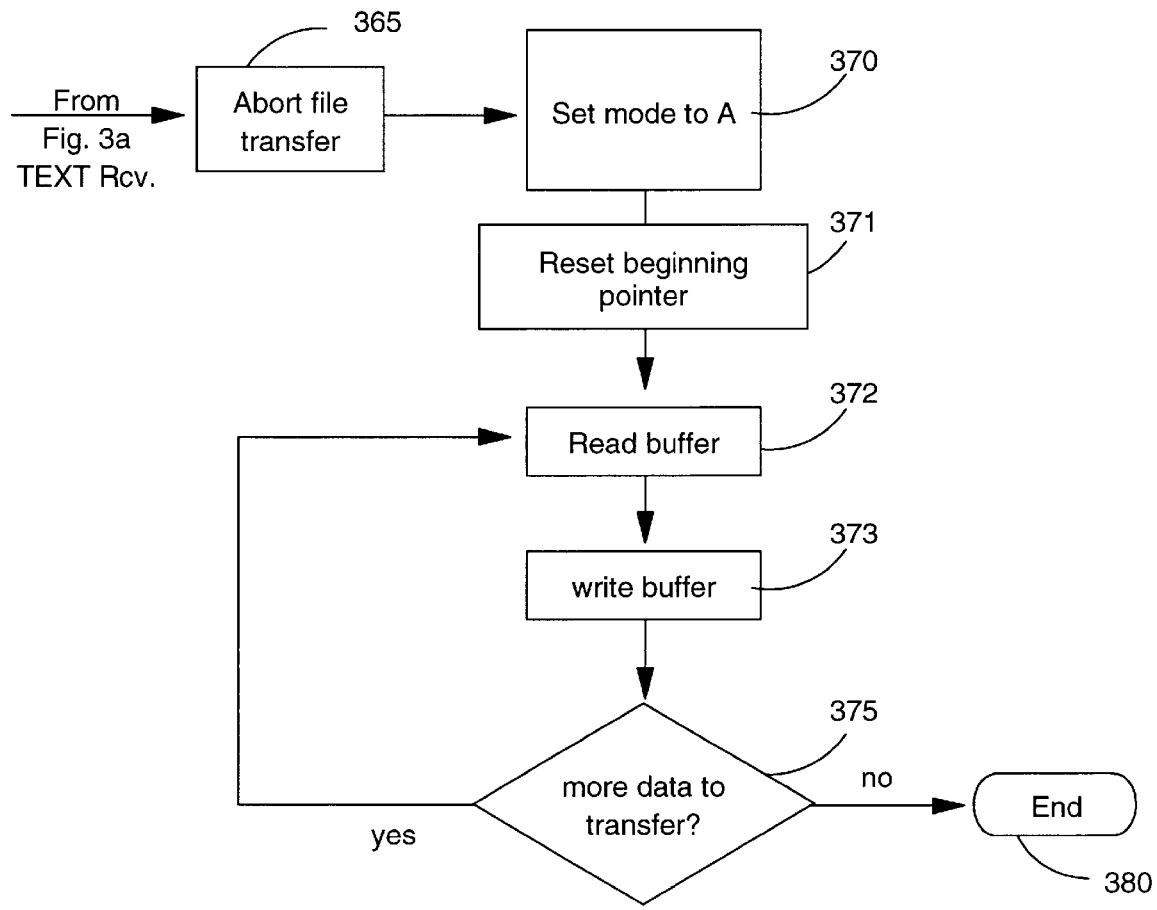

In FIG. 3, as in FIG. 2, the file transfer is initiated with the file transfer mode being set to binary 305. A state variable is set to detect 310 to enable the logic of Automode. The first buffer is then read 315 from the source and delivered to the target device. A check is then made to determine if the source host is an ASCII host or an EBCDIC host 320. This information is available from session initialization. If the source host is an ASCII host, the buffer is scanned for non-ASCII characters 325. If non-ASCII characters are found 330, then the buffer is written to the target location 335. This means that the file is a binary file. A test is made to determine if there is more data available for transfer 340. If there is, another buffer is read 345 from the source and control returns to 335. If there is no more data available for transfer, the transfer has completed 350.

If, at 320, the source host was determined to be an EBCDIC host, a scan is then made for non-EBCDIC characters 355. If non-EBCDIC characters are found 360, then control returns to the write buffer 335 and the file continues processing as a binary file.

If, at 360, no non-EBCDIC characters were found or at 330 no non-ASCII characters were found, this means that the file is a TEXT file. The transfer is aborted 365. The transfer mode is then set to TYPE A (which stands for ASCII, but is used as a generic term for all TEXT file transfers). The file pointer is then reset to the beginning of the file 371. The first buffer is read 372 from the source as a TEXT buffer, then written to the target 373 device. A test is made to determine whether there is more data to be transferred 375. If there is more data, then control returns to 372, otherwise the transfer terminates normally 380.

Figure 5:
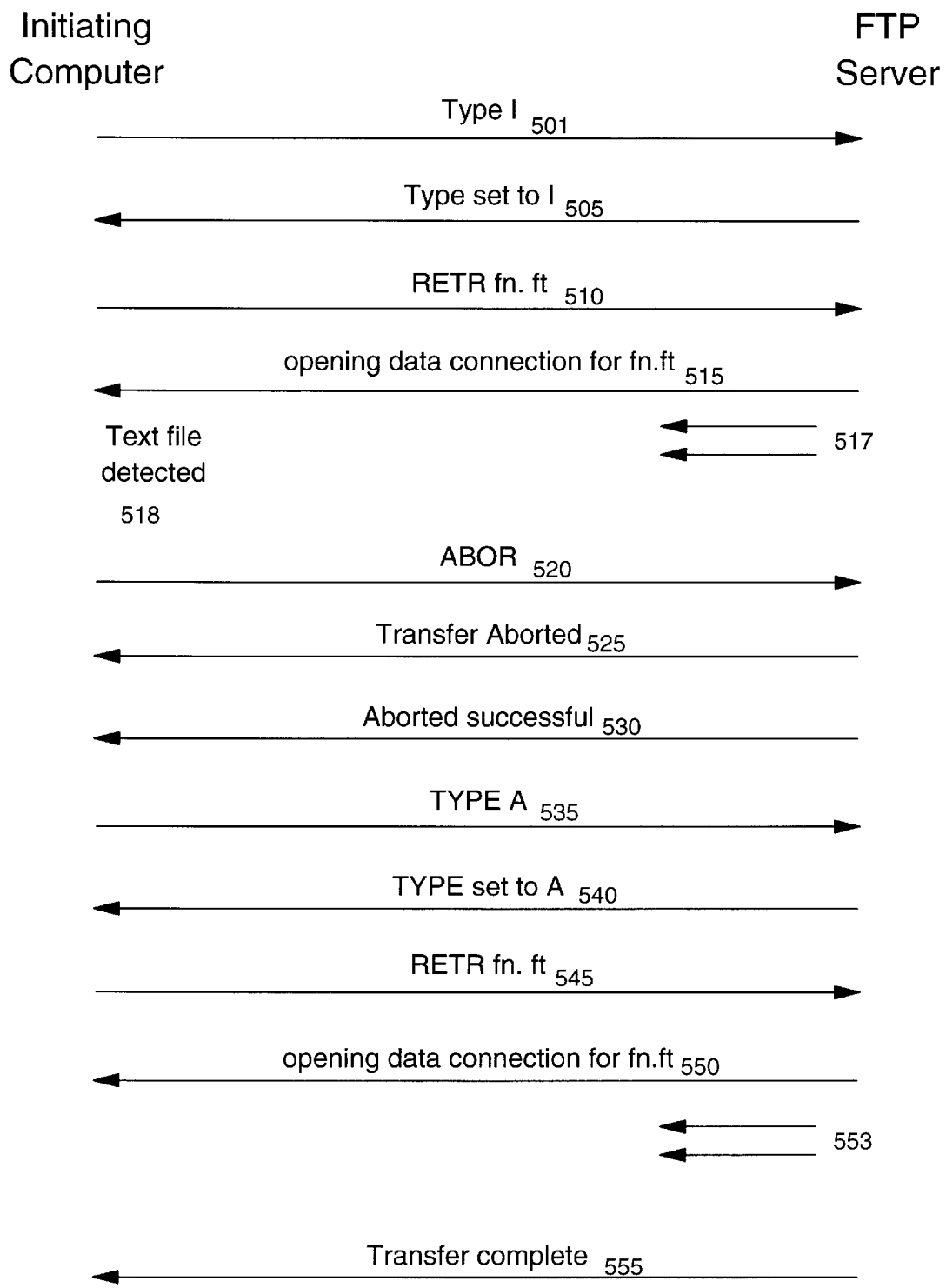
FIG. 5 is a sample of the information shared during initialization of file transfer.

During initialization of communication between two machines, the machines must exchange some information concerning what they are capable of and what environments they run in. This is required prior to the initiation of file transfer and is not new to the Automode application. FIG. 5 demonstrates some of the information which is transferred between the machines during the initialization process.

FIG. 5 shows a sample of the information which is transferred in preparation for and execution of the FTP file transfer. The initiating computer first sends a 'TYPE I' command 501 to the FTP server which, in response, sets the file transfer mode to image. The FTP server then acknowledges that the transfer type has been set to I 505. The initiating computer then sends a command to retrieve the desired file 510. The FTP server acknowledges that it is opening a data connection for the desired file 515. The FTP server then begins to send buffers of data 517. At 518, the initiating computer detects that the file being transferred is a TEXT file (by interrogating the buffer). The initiating computer then sends a command to the FTP server to abort the transfer 520. The FTP server acknowledges that the file transfer abort command was received 525, then acknowledges the successful completion of the abort processing 530. The initiating computer then sends a 'TYPE A' command to the FTP server 535 to instruct the server that the transfer mode will be TEXT (or ASCII). The server acknowledges the TYPE change 540, then the initiating computer sends a command to direct the FTP server to retrieve the desired file 545. The FTP server acknowledges the opening of the file to be sent 550, then sends the data 553 and indicates when it has concluded its transmission of the file 555.

The transmission using the algorithm of the present invention is biased to maximize performance for files in a binary format. This is to take advantage of the current state of the art where the majority (95%) of the files transmitted over the Internet are in binary format. This allows the binary files to be transmitted using the Automode detection without any performance impact, yet still allows the TEXT files to be transmitted correctly with only a minor performance impact. It should be obvious to one skilled in the art that, should the statistical composition of the files transmitted over the internet change, the application could be modified to optimize the performance of the transmission of ASCII files.

What is claimed is:

1. A telecommunications method for transferring files between a source computer and a target computer using the Internet, TCP/IP and the FTP protocols, comprising the steps of:

initiating a file transfer operation;

setting an FTP transfer mode to binary;

reading a first buffer from the source computer;

writing the first buffer to the target computer;

scanning the first buffer to determine whether it contains any non-ASCII characters;

if no non-ASCII characters are found,
aborting said file transfer operation by issuing an FTP abort transfer,
a new file transfer operation,
setting the FTP transfer mode to ASCII,
re-reading said first buffer from the source computer, and
re-writing said first buffer to the target computer; and transferring data until a complete file is delivered by reading each subsequent buffer of said file from the source computer and writing said subsequent buffers to the target computer.

2. A telecommunications method for transferring files between a source computer and a target computer using the Internet, TCP/IP and the FTP protocols, comprising the steps of:

initiating a file transfer operation;

setting an FTP transfer mode to binary;

reading a first buffer from the source computer;

writing the first buffer to the target computer;

scanning the first buffer to determine whether it contains any non-TEXT characters;

if no non-TEXT characters are found,
aborting said file transfer operation by issuing an FTP abort transfer,
initiating a new file transfer operation,
setting the FTP transfer mode to TYPE A,
re-reading said first buffer from the source computer, and
re-writing said first buffer to the target computer; and transferring data until a complete file is delivered by reading each subsequent buffer of said file from the source computer and writing said subsequent buffers to the target computer.

3. The method as described in either of claim 1 or 2 wherein the transfer is invoked by:

locating a pointer, using a pointing device, on top of a file name or icon;

indicating the file name or icon by depressing an appropriate button of the pointing device;

dragging the file name or icon to a window representing the target computer; and, releasing the file name or icon over the window representing the target computer.

4. A telecommunications method for transferring files between a source computer connected to the Internet running a source operating system and a target computer connected to the Internet running a target operating system, comprising the steps of:

invoking a TCP/IP FTP program;

initiating a file transfer operation;

setting an FTP transfer mode to binary;

reading a first buffer from the source computer;

writing the first buffer to the target computer;

determining the source operating system of the source computer;

scanning the first buffer to determine whether it contains any non-ASCII characters if the source operating system is ASCII or non-EBCDIC characters if the source operating system is EBCDIC;

if no non-ASCII or non-EBCDIC characters are found, aborting said file transfer operation by issuing an FTP abort transfer, initiating a new file transfer operation, setting the FTP transfer mode to TEXT (TYPE=A), re-reading said first buffer from the source computer, and re-writing said first buffer to the target computer; and transferring data until a complete file is delivered by reading each subsequent buffer of said file from the source computer and writing said subsequent buffers to the target computer.

5. The method as described in claim 4 wherein the transfer is invoked by:

locating a pointer, using a pointing device, on top of a file name or icon;

indicating the file name or icon by depressing an appropriate button of the pointing device;

dragging the file name or icon to a window representing the target computer; and releasing the file name or icon over the window representing the target computer.

6. A telecommunications computer system comprising:

a first computer device;

an FTP server;

means for initiating a file transfer operation;

means for setting an FTP transfer mode to binary;

means for reading a first buffer from a source computer;

means for writing the first buffer to a target computer, wherein a first of said device and said server is said source computer and a second of said device and said server is said target computer;

means, responsive to said writing means, for scanning the first buffer to determine whether it contains any non-ASCII characters; if no non-ASCII characters are found, means for:

aborting said file transfer operation by issuing an FTP abort transfer, initiating a new file transfer operation, setting the FTP transfer mode to ASCII, re-reading said first buffer from the source computer, and re-writing said first buffer to the target computer; and means for transferring data until a complete file is delivered by reading each subsequent buffer of said file from the source computer and writing said subsequent buffers to the target computer.

7. A computer program product for transferring files from a source computer to a target computer over the Internet using TCP/IP and FTP, the computer program product comprising:

a computer-readable storage medium having computer-readable program code means embodied in said medium, said computer-readable program code means comprising:

computer-readable program code means for initiating a file transfer operation;

computer-readable program code means for setting an FTP transfer mode to binary;

computer-readable program code means for reading a first buffer from the source computer;

computer-readable program code means for writing the first buffer to the target computer;

computer-readable program code means for scanning the first buffer to determine whether it contains any non-ASCII characters;

if no non-ASCII characters are found, computer-readable program code means for;

aborting said file transfer operation by issuing an FTP abort transfer, a new file transfer operation, setting the FTP transfer mode to ASCII, re-reading said first buffer from the source computer, and re-writing said first buffer to the target computer; and computer-readable program code means for transferring data until a complete file is delivered by reading each subsequent buffer of said file from the source computer and writing said subsequent buffers to the target computer.

* * * * *